United States Patent
Poyas (10) Patent No.: US 8,132,361 B1
(45) Date of Patent: Mar. 13, 2012

(54) APPARATUS FOR STAKING TREES (76) Inventor: Robert W. Poyas, San Francisco, CA (US)

(*) Notice: Subject to any disclaimer, the term of this patent is extended or adjusted under 35 U.S.C. 154(b) by 63 days.

(21) Appl. No.: 12/651,837

(22) Filed: Jan. 4, 2010

Related U.S. Application Data (63) Continuation-in-part of application No. 11/471,852, filed on Jun. 20, 2006, now Pat. No. 7,661,224.

(60) Provisional application No. 60/772,306, filed on Feb. 10, 2006.

(51) Int. Cl.
A01G 17/10 (2006.01)

(52) U.S. Cl. ............................... 47/42; 47/43; 248/218.4

(58) Field of Classification Search ................ 47/44, 45, 47/47, 32.4–32.6; 248/218.4, 508; 24/278; 292/256, 301
See application file for complete search history.

(56) References Cited

U.S. PATENT DOCUMENTS

| | | | | |
|---|---|---|---|---|
| 535,887 | A * | 3/1895 | Brown | ............... 248/523 |
| 1,031,941 | A | 7/1912 | Lanham | |
| 2,121,379 | A | 6/1938 | Young | |
| 2,194,800 | A | 3/1940 | Ley | |
| 2,617,617 | A | 11/1952 | Norman et al. | |
| D214,330 | S | 6/1969 | Maxwell | |
| 3,505,761 | A | 4/1970 | Prieur | |
| 3,526,056 | A | 9/1970 | Stropkay | |
| D218,907 | S | 10/1970 | Maxwell | |
| 3,559,339 | A * | 2/1971 | Worley | ............... 47/45 |
| 4,381,621 | A | 5/1983 | Eby | |
| 4,480,403 | A * | 11/1984 | Williams | ............... 47/42 |
| 4,520,590 | A | 6/1985 | Schuh | |
| 4,738,050 | A | 4/1988 | Dickinson | |
| D332,729 | S | 1/1993 | Sessions | |
| 5,199,677 | A | 4/1993 | Sessions | |
| 5,402,600 | A * | 4/1995 | Tompkins | ............... 47/42 |
| 5,435,097 | A * | 7/1995 | Harper | ............... 47/43 |
| 6,073,391 | A * | 6/2000 | Tort et al. | ............... 47/42 |
| 6,299,125 | B1 | 10/2001 | Zayeratabat | |
| 6,964,126 | B1 | 11/2005 | Anderson | |
| 7,661,224 | B1 | 2/2010 | Poyas | |
| 2006/0150478 | A1 | 7/2006 | Gfesser | |

FOREIGN PATENT DOCUMENTS

| | | |
|---|---|---|
| CH | 659848 A5 | 2/1987 |
| DE | 3437769 A1 | 4/1986 |
| DE | 3912821 C1 | 9/1990 |

* cited by examiner

Primary Examiner — Kristen Hayes
(74) Attorney, Agent, or Firm — John P. O'Banion

(57) ABSTRACT

A system and apparatus for supporting newly planted trees or other upright for use with a plurality of stakes that have been positioned adjacent and around the tree to be supported. In one aspect of the invention, the individual stakes are rigidly secured together by elements which are vertically movable along the stakes and releasably secured to the stakes at desired vertical positions. In another aspect of the invention, flexible tie members interconnect the tree trunk with a vertical stake. The connection between the tie member and its associated stake is such that the connection may be releasably locked to the stake at different vertical positions along the stake.

10 Claims, 7 Drawing Sheets

APPARATUS FOR STAKING TREES

CROSS-REFERENCE TO RELATED APPLICATIONS

This application is a continuation-in-part of U.S. patent application Ser. No. 11/471,852, filed on Jun. 20, 2006, now U.S. Pat. No. 7,661,224, incorporated herein by reference in its entirety, which claims priority from U.S. provisional application Ser. No. 60/772,306, filed Feb. 10, 2006, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to systems and devices for the staking of newly planted immature trees, and more particularly to a system in which the supporting stakes and the tree are configured to provide safe, healthy support for the tree, and which allows for ease in adjustments to prevent damage to the young tree.

2. Description of Related Art

The use of stakes in connection with efforts to stabilize newly planted trees is well known in the art. A typical young tree with a small flexible trunk is not self-supporting. Accordingly, it is common practice to drive one or more rigid stakes or poles into the ground adjacent and parallel to the tree. Ropes, ties, straps, or like flexible members are then wrapped around the tree trunk and the adjacent stake or pole in an attempt to stabilize the tree, until the subsequent root growth and trunk stability permits the tree to maintain a vertical orientation without any external assistance.

There are a number of problems with the foregoing system. In some instances, the straps or ties which interconnect the stake and the tree trunk tend to gouge or dig into the tree trunk and damage, or even destroy the tree. This is particularly true when the wind urges the tree away from its supporting stake, and/or when the tree grows and its enlarging circumference expands around the supporting strap, tie, etc.

Other problems arise due to the fact that the stakes themselves. Even though the stake is made of rigid material and driven into the ground for stability, it may nevertheless list or lean from a normally vertical position, and thus fail to give the appropriate stabilizing effect to the tree to which the stake or stakes are attached.

Moving the ropes, ties, or straps vertically on the tree trunk at timed intervals may prevent damage to the tree trunk, but such movement also requires movement of these flexible members along the stakes as well. This can present a time consuming and frequently difficult operation.

BRIEF SUMMARY OF THE INVENTION

The present invention is adapted to overcome the difficulties discussed above and to provide a staking arrangement which will support an immature tree trunk in a substantially vertical disposition until the roots of the tree and/or the size of the trunk have grown sufficiently to be self-supporting. All of this is accomplished without harmful damage to the tree.

A feature of the invention is to provide a tree staking arrangement in which a plurality of stakes are driven into the ground and positioned at generally equal spacing along a circumference whose center will be occupied by the tree. The apparatus of the invention is preferably adapted to 2, 3 and 4 stake systems that may utilize spring tie sleeves or corded rubber ties in various embodiments. In the preferred 2 stake system the stakes are linearly oriented with the tree positioned between the two stakes. The tree is centered in a triangle formed from stakes in the 3 stake system or in a square shape formed from stakes in the 4 stake systems.

A further feature of the present invention is the provision of two discrete but cooperating elements for stabilizing a newly planted immature tree. The first system employs a plurality of stakes driven into the ground in which rigid cross-bracing of the stakes is provided. The second element features flexible ties between each stake and its adjacent tree. In each of the disclosed systems, the connection of the cross-bracing and of the ties to the stakes is such that the vertical position of the cross-bracing and of the ties may be readily adjusted before any damage to the tree occurs Another feature of the invention provides an apparatus for supporting a planted tree adapted to couple to a plurality of stakes, having a tie-supporting member for mounting on each stake for movement along the length thereof with means for releasably securing each supporting member at selected portions along the length of the stake on which it is mounted, and a plurality of flexible tie members, each having a portion attached to one of the members and another portion adapted to wrap around a tree supported by the stakes and at least one cross brace.

The various embodiments of the apparatus for supporting a planted tree or other upright workpiece have a plurality of tie brackets that are adapted to reversibly couple to selected positions on stakes that have been driven into the ground and spaced around the trunk of a tree. At least one rigid element extending between tie brackets of two adjacent stakes configured to be releasably secured with the tie brackets is provided. At least two rigid elements are preferred in the 3 stake system and at least three rigid elements are preferred in the 4 stake system embodiments. Flexible tie elements adapted to be wrapped around the supported tree are releasably attached to a second set of tie brackets in the preferred embodiment.

One system uses corded rubber strips that are joined to a tie bracket that has the same structure as the tie bracket coupling the rigid element to the stakes. In another system, a different bracket is used to mount and position the spring ties than is used to couple the rigid element to the stakes. The spring tie bracket is capable of receiving and securing one or more wires or cables from the spring tie to the bracket.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 18. It will be appreciated that the apparatus may vary as to configuration and as to details of the parts, and that the method may vary as to the specific steps and sequence, without departing from the basic concepts as disclosed herein.

The apparatus and system of the present invention can be illustrated in three general apparatus embodiments that are shown in FIGS. 1-8, FIGS. 9-13 and FIGS. 14-18. These embodiments have two, three and four stake tree support systems and may use spring ties or corded rubber tree ties as examples.

The apparatus and systems of the present invention for supporting immature trees or other uprights is adapted for use with stakes, rods, or poles formed of some rigid material such as wood, metal, or the like. Preferably the stakes are generally circular in cross-section for receiving cylindrical sleeves that are capable of vertical adjustment or movement along the length of the stake. In connection with stake supports for newly planted trees, it is common practice to use stakes that are approximately ten to eleven feet long, that are driven into the ground adjacent the point on the ground where the new tree will be planted, leaving about seven to eight feet of the stake length above the ground elevation, along which the tree may be releasably tethered.

In some cases, the person planting a tree will drive a stake closely adjacent to the tree trunk, and then use some form of flexible tie to releasably attach the tree and the stake together. There are aspects of the present invention which may be applicable to such a procedure. However, it is better practice, particularly among professionals, to use two or three stakes per tree, and the features of this invention will be primarily described in connection with the two, three or four stake arrangements.

Figure 1:
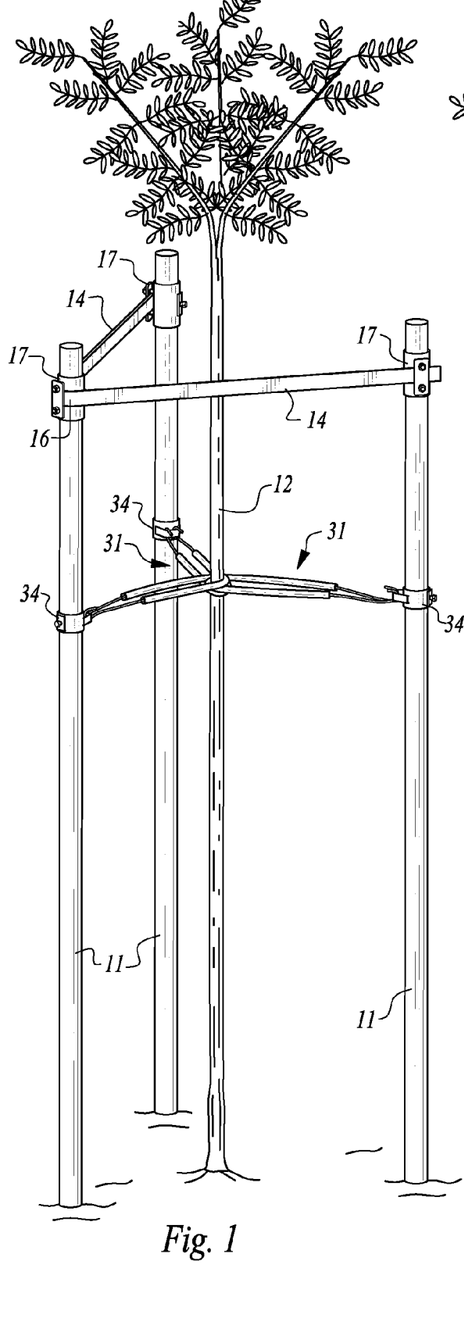
FIG. 1 is a perspective view illustrating one three stake embodiment of the invention.
Figure 2:
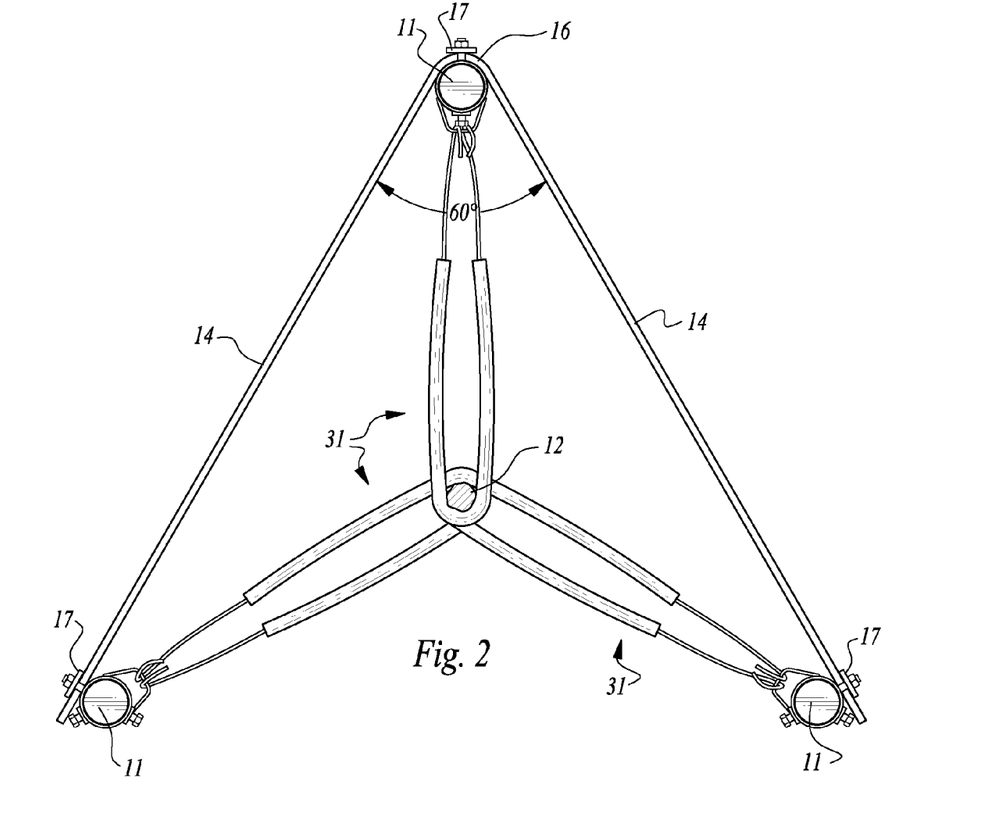
FIG. 2 is a top plan view of the three stake embodiment of the invention as shown in FIG. 1.

Referring first to FIGS. 1 and 2 of the drawings, a three stake arrangement of one embodiment of the invention is illustrated in which three stakes 11 are disposed generally equidistant around a tree 12. The stakes 11 are shown as solid wooden rods, but as previously mentioned, the stakes could also be formed of metal or plastic tubing, or other rigid, form-retaining structural element 15 which may be driven into the ground and provide lateral support to a tree which may be tied to the stake. In another embodiment, the stakes are not part of the apparatus that is adapted to be reversibly mounted to any upright member.

Even an immature tree may have substantial foliage, and under high wind conditions the wind force tends to bend the tree and impose a considerable bending or lateral force on the tied stake upwind from the tree. Accordingly, as one feature of the present invention, a reinforcing or cross-bracing system is provided between the stakes 11 and independent of their ties to the tree 12. As shown, the bracing comprises rigid elements 14 horizontally disposed between and attached to adjacent stakes 11 with a bracket, the cross brace sleeve 17. The positioning of the bracing elements is such that they do not interfere with, or engage the trunk of the tree 12, even during limited horizontal movement or bending of the tree under windy conditions.

Although separate components of rigid elements 14 could be used (e.g., a simple length of strap metal, having about a one inch width), it is preferable to use a single piece of strap metal bent as indicated at 16 to embrace one stake, with the angularly related legs (with an included angle of about 60°) having their distal end positions attached to two adjacent stakes as shown in FIG. 2. This effectively locks the three stakes 11 together and avoids relative movement between the stakes, even under wind load conditions; and further limits movement of any stake upwind of the tree 12 against which the wind is acting.

Figures 5, 6, 7, 8:
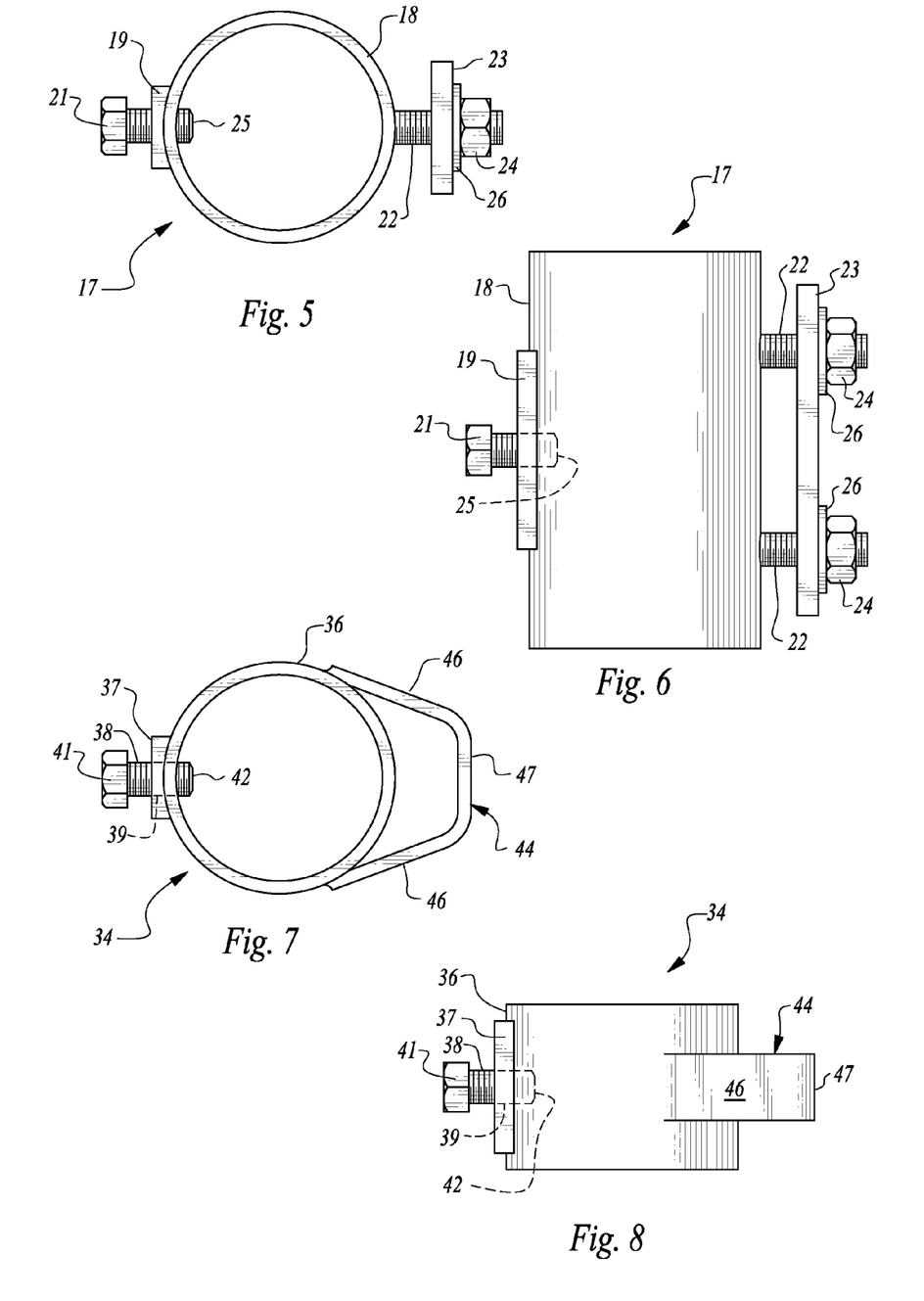
FIG. 5 is a top plan view of one embodiment of a cross brace sleeve.
FIG. 6 is a side elevational view of one embodiment of a cross brace sleeve shown in FIG. 5.
FIG. 7 is a top plan view of one embodiment of a tie bracket sleeve.
FIG. 8 is a side elevational view of one embodiment of a tie bracket sleeve shown in FIG. 7.

It is preferable that the attachment of the one or more cross-braces 14 or 51 to the stakes 11 be such that the height thereof can be varied as the tree grows or that additional braces can be added at different elevations along the tree trunk without any direct securing of the brace to the tree 12. This is accomplished by means of a cross-brace sleeve 17 as shown in FIG. 1, FIG. 5 and FIG. 6. The brace sleeve 17 includes a rigid tubular section 18 (approximately four inches long is preferred) having an internal diameter slightly larger than the external diameter of the stake 11 on which it is telescopically mounted. In the embodiment shown in FIG. 5 and FIG. 6, section 18 of brace sleeve 17 may be releasably attached to its stake 11 at any desired elevation by providing a rigid gasket 19 attached to the outside of section 18, such as by welding, provided with an internally threaded aperture connecting with an aperture in a wall of the section 18. A machine bolt 21 having an enlarged head, or other means for rotating the bolt to cause its distal end portion 25 to pass into the cavity defined by the sleeve and engage the stake 11 disposed in the sleeve.

The exposed end of portion 25 is shown flat in FIG. 5 and FIG. 6 and this use is appropriate where the stake 11 is plastic or metal. However, for a wooden stake 11, the end 25 may be pointed so as to penetrate the stake and obtain a better lock against vertical displacement in another embodiment.

Diametrically opposite bolt 21 is a pair of vertically spaced bolts 22 that are welded or otherwise secured to the exterior of sleeve 18. A strap-like rigid plate 23 is provided with a pair of apertures for mounting the plate on the bolts 22 of the sleeve 18. Nuts 24 and washers 26 are threaded onto the bolts so that the tightening of the nuts will cause plate 22 to move towards the sleeve 18 and lock the cross-brace elements 14 to the sleeve 18. The elements 14 may be placed in the opening or passageway defined by sleeve 18, plate 23 and bolts 22 when the nuts 24 are loosened.

The foregoing explanation describes how the cross braces 14 or 51 and cross brace sleeves 17 are releasably locked together at a desired space between each other and at a selected vertical position along the length of stake 11. An explanation will now be given of the manner in which the stakes are attached to the tree 12 so as to control bending or lateral movement of the tree. In general terms, flexible tie members 31 connect the tree 12 with the respective stakes 11 by a tie bracket 34. The tie members 31 directly engage a portion of the tree 12 and are preferably flexible and formed of relatively soft material so as to minimize any abrasive or gouging action of the ties in rubbing against the tree trunk.

As will be seen in FIG. 2, each bracket 34 coupled to a stake 11 has a tie 31 secured thereto and then wrapped around the tree trunk. The ties 31 may also be covered with soft material and can be made of fabric, elastic material, leather, or other material such as wire which is embedded in rubber or like material which prevent the wire from cutting into the tree 12. There are many commercial ties 31 that are available for this purpose.

In a manner somewhat similar to the cross-bracing sleeves 18 supporting the braces 14, there is disclosed tie bracket sleeves 34, best illustrated in FIGS. 7 and 8 of the drawings. Each tie sleeve 34 includes a tubular sleeve portion 36 whose inner diameter is slightly larger than the outer diameter of stakes 11. Sleeve portions 36 can have a shorter axial extent (e.g., one inch) than sleeve portions 18 and are can be adjusted to slide vertically along its stake until it reaches a height at which the tree is to be attached to the stake. At this point, the tie sleeve 34 may be releasably fixed to its stake. The latter is accomplished by welding or otherwise securing a back plate 37 to the sleeve 36. The back plate 37 is provided with an internally threaded aperture 38, through which a bolt 39 is threaded in the embodiment shown in FIG. 7 and FIG. 8.

The exposed end of the bolt 38 has an enlarged head 41 that permit the bolt to be threaded into or out of the cavity defined by the sleeve 36. The distal end 42 of the bolt 38 will engage the stake in the cavity and lock the sleeve 34 to the stake 11. As discussed in connection with the sleeve 18, the end 42 of bolt 38 is preferably flat if the stake is constructed of metal, but may be pointed if the stake is formed of wood.

Diametrically opposite the back plate 37 is a generally V-shaped to arcuate bracket 44 whose legs 46 are welded or otherwise secured to the sleeve 36 and whose apex 47 is spaced from the sleeve so as to define an opening or passageway through which the tie member may pass and/or be secured.

Figure 3:
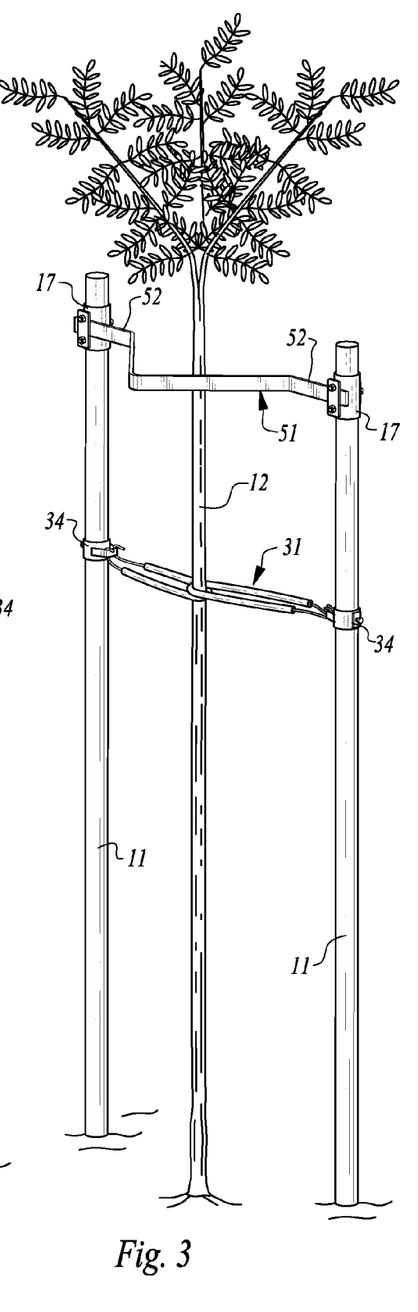
FIG. 3 is a perspective view, similar to FIG. 1, and illustrating a two stake alternative embodiment of the invention.
Figure 4:
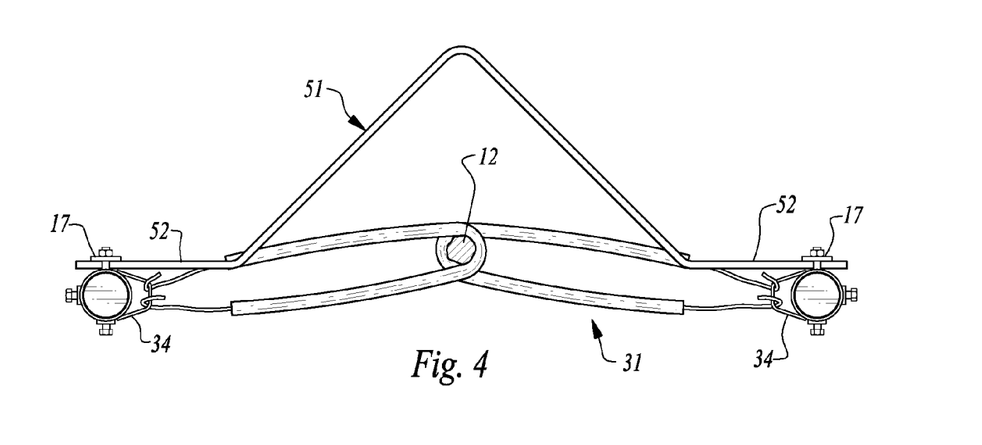
FIG. 4 is a top plan view of the two stake embodiment of the invention as shown in FIG. 3.

In those instances where it is determined that two stakes are adequate to properly support the tree 12, the cross-brace sleeve 17 and the tie sleeve 34 can remain the same as with the three stake arrangement. Here, and as shown in FIGS. 3 and 4, the cross-bracing includes a rigid member 51 having a V-shaped central section and co-linear flanges 52 extending from the ends of the central section. The flanges 52 may be inserted in the space or passageway between plate 23 and sleeve 18 and be locked therein upon tightening of the bolts 22. It should be understood that when three stakes are used, it is possible to use a simple linear cross-bracing element extending between two adjacent stakes. However, with only two stakes, if a simple straight bar is used, it would be in line with or closely adjacent the tree trunk and undesirably scrape against the same.

The arrangement described and discussed herein permits multiple stakes to reinforce each other and consequently give added stability to the tree. It further permits simple changes in the height or elevation of the cross-bracing, as well as permitting more than one set of braces at different elevations. It also provides for a relatively simple manner of tying a tree to two or more stakes with the capability of easily moving the ties to different elevations along the tree trunk so as to avoid continuous abrasion or scraping at any one portion of the tree.

Turning now to FIG. 9 through FIG. 13, a first alternative embodiment 100 of the invention is shown with two, three and four stake systems. The two stake system illustrated in FIG. 9 has at least one cross brace 102 that can reversibly couple to a pair of brace brackets 104 shown in detail in FIG. 10. The apparatus 100 also includes spring ties 106 that are wrapped around a tree 110 and are secured to a spring tie bracket 108 shown in detail in FIG. 11. The spring ties 106 preferably have a strong flexible center 112 such as a wire or cable that has a pliant soft exterior that engages the tree 110 without damaging the tree exterior if the tree 110 or the spring ties 106 move.

Figure 9:
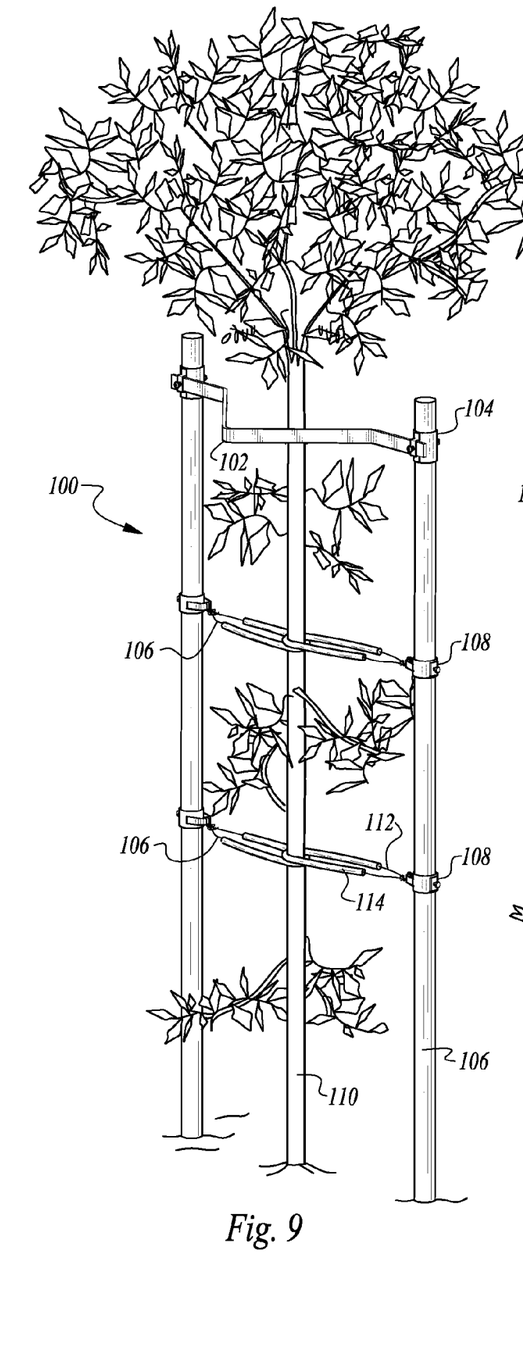
FIG. 9 is a perspective view illustrating a first alternative embodiment of the two stake system with spring tie sleeves according to the invention.
Figure 10:
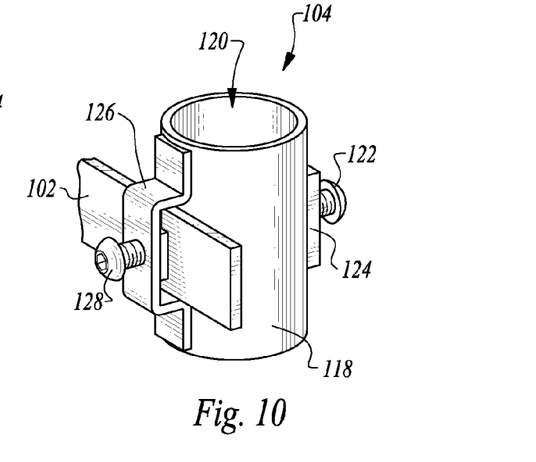
FIG. 10 is a perspective view of one embodiment of a cross-brace sleeve used in the two, three and four stake systems shown in FIG. 9, FIG. 12 and FIG. 13.

The two stake system illustrated in FIG. 9 is adapted to be placed on two generally cylindrical stakes 116 that are placed on opposing sides of the tree 110 and driven into the ground. As seen in FIG. 10, the brace bracket 104 has a tubular body or sleeve 118 that has an interior 120 that is sized to have a diameter that is slightly larger than the cross sectional diameter of the stake 116 so that it can slide along the length of the exterior of the stake 116 to any desired position. The brace sleeve body 118 has a stake engaging screw 122 that can advance on threads through the body 118 to the interior 120 to engage the stake 116. An optional panel 124 mounted to the exterior of the sleeve body 118 is present in the embodiment shown in FIG. 10 to reinforce the wall of body 118 that has additional threads to support screw 122.

The stake engagement screw 122 can selected to be pointed at the tip so that it can be driven into the wood of a wooden stake or the tip can have a flat or beveled head that will frictionally engage the exterior of the stake 116 to fix the position of the cross brace bracket 104. Although one stake engagement screw 122 is shown, it will be understood that more than one screw and set of threads can be used to position the bracket.

The body 118 also has means for securing the cross brace to the bracket 104. In the embodiment shown in FIG. 10, there is a member 126 mounted to body 118 forming a ring or slot that can receive and secure a cross brace 102. The cross brace 102 is threaded through the slot of member 126 and screw 128 is advanced along threads in member 126 to engage and secure the cross-brace 102. In one embodiment, there are a series of holes provided along the length of the cross brace 102 so that the screw 128 can be advanced through a hole in member 126 and the hole in brace 102 and traverse the brace thereby securing it to the bracket 104.

Figure 11:
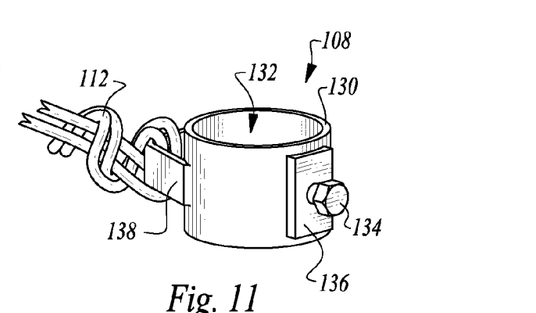
FIG. 11 is a perspective view of one embodiment of a spring tie bracket sleeve used in the two, three and four stake systems shown in FIG. 9, FIG. 12 and FIG. 13.

The spring tie bracket 108 that is used to secure the spring tie 106 is shown in detail in FIG. 11. In this embodiment of the spring tie bracket 108, the bracket is adapted to have a bracket body 130 with a central sleeve 132 that has a diameter that is slightly larger than the diameter of a stake. The bracket 108 can be positioned along the length of the stake at any desired position that a spring tie is needed. As seen in FIG. 9, the spring tie brackets 108 are paired and placed at approximately the same position on each stake. The spring tie bracket 108 is secured into position by a screw or bolt 134 that resides within a threaded bore through support 136 and the sidewall of the bracket body 130. The bolt 134 can be advanced along the threads to engage the stake. The distal end of bolt 134 can be pointed to be driven into the softer wood of a wooden stake or can be flat or beveled to frictionally engage the stake to secure the position of bracket on the stake.

The spring tie 106 is looped around the tree and back to the bracket 108. The center wire or cable 112 of the spring tie 106 is coupled to the bracket 108 by passing the wires 112 through a loop 138 attached to the exterior wall of the bracket body 130 in the embodiment shown in FIG. 11. Although a loop 138 is shown, it will be understood that the wires 112 of the spring tie can be reversibly coupled to the bracket body 130 with the use of a hook or eyelet.

In another embodiment, at least one cross brace bracket 104 is placed onto each of the stakes 116 and each end of the cross brace 102 is secured to the bracket 104 on one of the stakes 116 so that there is a stake 116 on each end of the linear cross brace 102. The stakes are then brought to the tree 110 and properly positioned and each stake is subsequently driven into the ground.

Figure 12:
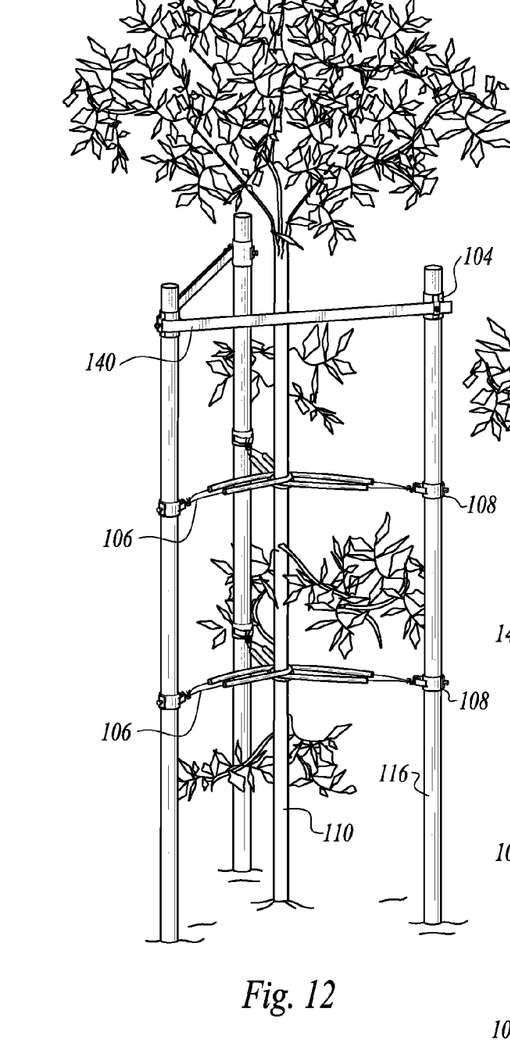
FIG. 12 is a perspective view illustrating a first alternative embodiment of the three stake system with spring tie sleeves according to the invention.

FIG. 12 illustrates one of the three stake versions of the first alternative embodiment of the invention with two sets of spring ties 106 supporting the tree 110. The stakes are spaced in a triangular configuration using a cross brace 140 that is mounted to the three stakes with a brace brackets 104. The details of the brace bracket can be seen in FIG. 10. The cross brace 140 is preferably a single piece with an angle that is approximately 60 degrees as shown in FIG. 2. Although one cross brace 140 is shown in FIG. 12, more than one cross brace and bracket set can be used. The cross brace 140 is placed through the slot of member 126 of each of the brace brackets 104 that have been placed on each of the stakes 116 and secured by the bracket screws 128. Two sets of spring ties 106 are secured to the stakes 116 with spring tie brackets 108 as shown in detail in FIG. 11.

Figure 13:
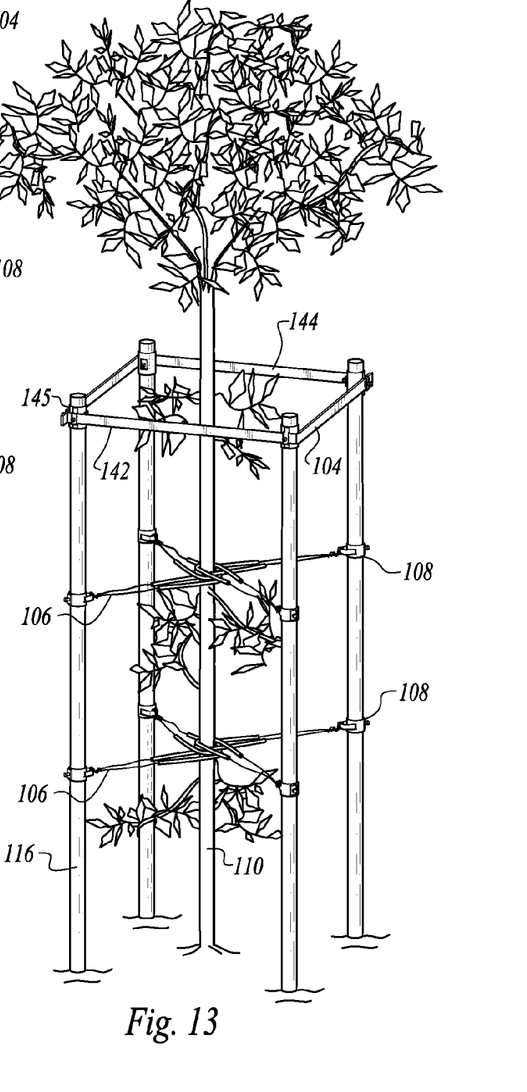
FIG. 13 is a perspective view illustrating a first alternative embodiment of the four stake system with spring tie sleeves according to the invention.
Figures 14, 15, 16:
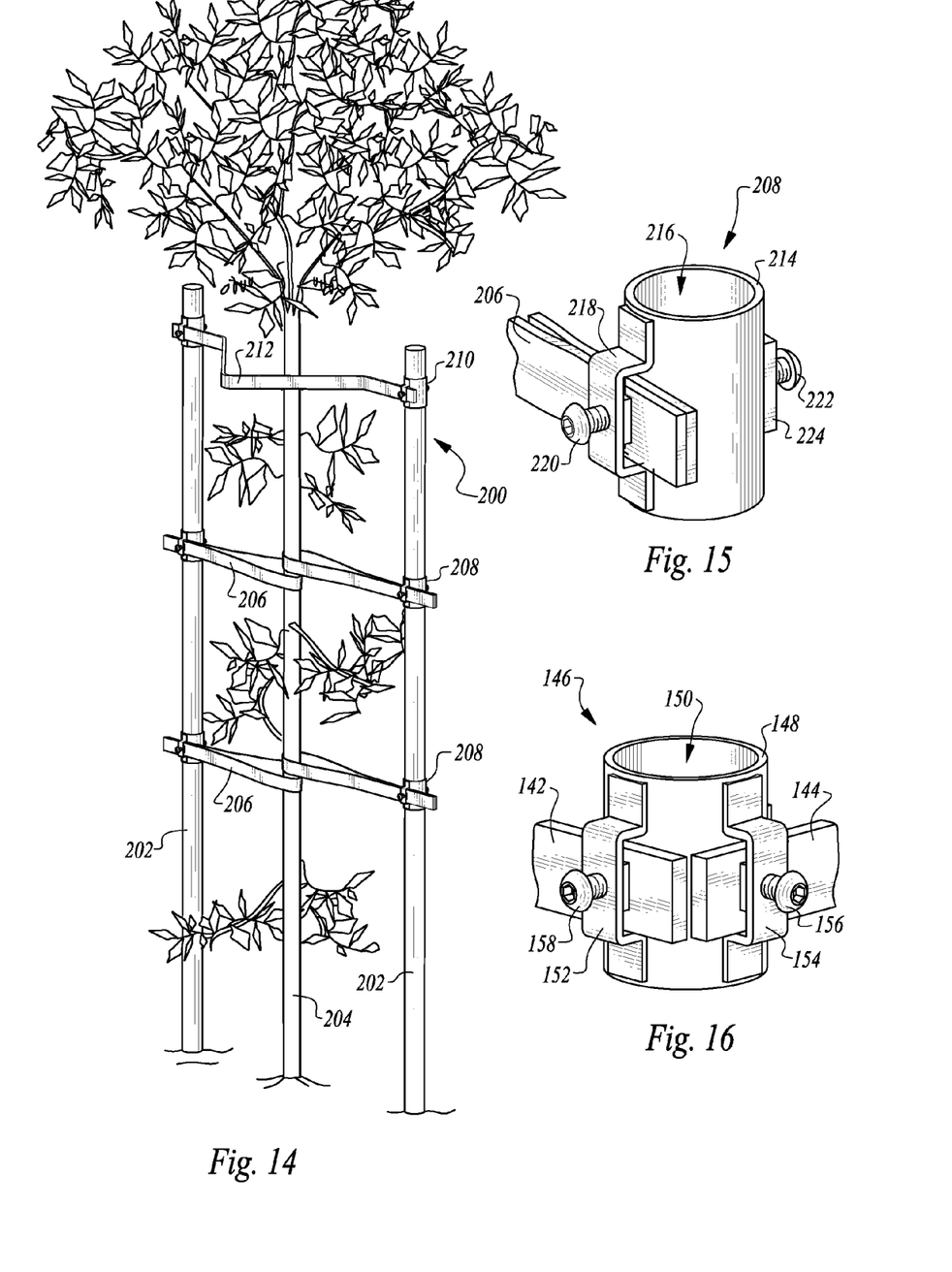
FIG. 14 is a perspective view illustrating a second alternative embodiment of the two stake system with corded rubber tree tie sleeves according to the invention.
FIG. 15 is a perspective view of one embodiment of a corded rubber tree tie bracket sleeve used in the two, three and four stake systems shown in FIG. 14, FIG. 17 and FIG. 18.
FIG. 16 is a perspective view of one embodiment of a cross-brace sleeve fixing two angular cross braces used in the four stake systems shown in FIG. 18.

The four stake version set in a square configuration with two sets of spring ties is shown in FIG. 13. In this embodiment, there are two cross braces 142,144 that are used to form the square with the four stakes 116. Each cross brace 142,144 has an approximately ninety degree angle with legs of equal length. The cross braces are reversibly mounted to the stakes 116 with two types of brace brackets in FIG. 13. The individual brackets are shown in FIG. 10 and FIG. 16. One leg of the right angle of the cross brace 142 is placed through the slot formed by member 126 of bracket 104 illustrated in FIG. 10 until it reaches the angle so that the bracket 104 and the stake 116 are in the interior of the angle of the cross brace 142. Likewise, one leg of the second cross brace 144 is placed through the slot of bracket 104 so that the bracket is at the interior of the angle of the cross brace 144 and the legs extend outwardly from the bracket 104.

One leg of cross brace 142 and one leg from cross brace 144 are preferably coupled to a second type of bracket 146 like that shown in FIG. 16. Referring specifically to FIG. 16, tubular brace bracket 146 has a sleeve body 148 that has an interior 150 sized to be slightly larger than a stake 116 so that it can slide freely to a desired position along the length of the stake 116. The bracket 146 also has a transverse screw or bolt (not shown in FIG. 16) that secures the bracket 146 to the stake 116.

The body 148 of bracket 146 has two slots formed from slot members 152 and 154 that are mounted 90 degrees from each other on the exterior of body 148 as seen in FIG. 16. The legs of cross brace 142 and cross brace 144 are positioned in the slots of members 152 and 154 and secured in place. The slot members 152 and 154 have bolts 156 and 158 respectively that can be advanced through a threaded bore in the slot members to apply pressure on the legs of the cross braces 142, 144 that are disposed in the slots. In one embodiment, a there are holes near the end of the legs of the cross braces at a point that will let the bolts 156 or 158 enter and restrain the cross braces 142, 144 within the bracket 146. Accordingly, two single brace brackets 104 and two double brace brackets 146 are used in the four stake embodiment with a single bracket 104 or a double bracket on each corner of the square and the double brackets 146 are diagonally opposite each other.

Spring ties 106 are wrapped around the tree or other upright 110 and secured to a spring tie bracket 108 that has been set at a desired position along the stake 116. The tree 110 is stabilized from four corners with the spring ties 106 and brackets 108 securely mounted to the four stakes 116. The four stakes 116 and cross brace brackets 142 and 144 held in the square configuration with the two sets of four restraining spring ties provide a resilient yet sturdy structure that can withstand wind and weather extremes without blowing over or dislodging with exposure to weather.

Figures 17, 18:
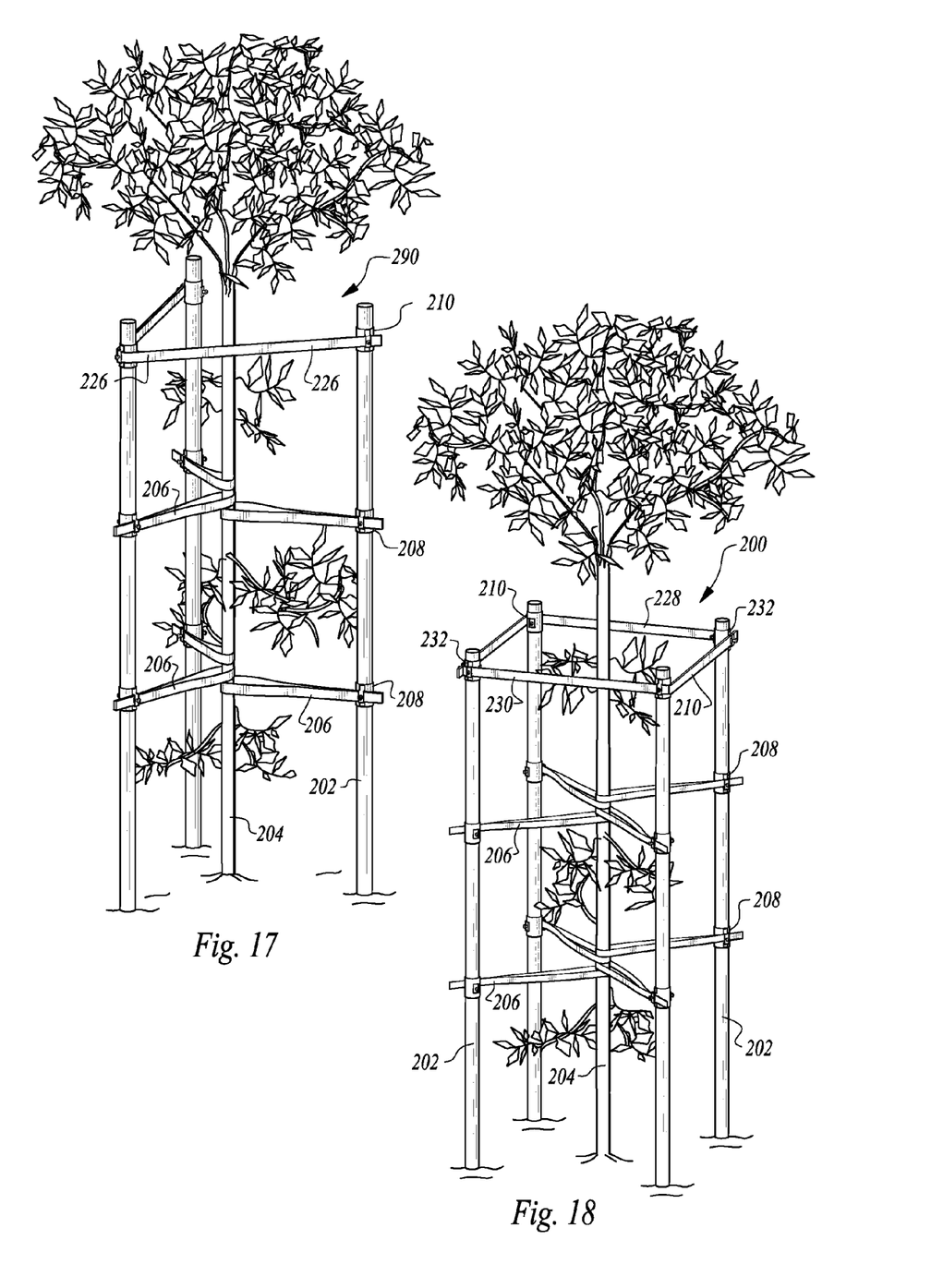
FIG. 17 is a perspective view illustrating a second alternative embodiment of the three stake system with corded rubber tree ties according to the invention.
FIG. 18 is a perspective view illustrating a second alternative embodiment of the four stake system with corded rubber tree ties according to the invention.

Turning now to FIG. 14 through FIG. 18, a second alternative embodiment 200 of the invention with two, three and four stake versions are generally shown. The two stake version is shown in FIG. 14 and the three stake and four stake versions are shown in FIG. 17 and FIG. 18 respectively.

In the two stake version shown in FIG. 14, a pair of stakes 202 are driven into the ground on opposite sides of the tree or other upright 204. The tree 204 is supported by corded rubber tree ties 206 that are fixed to stakes 202 by brackets 208. In the two and three stake versions shown in FIG. 14 and FIG. 16, the tree tie brackets 208 and the cross brace brackets 210 are preferably the same and are illustrated in detail in FIG. 15.

The system of FIG. 14 has a cross brace 212 that joins the two stakes 202 together through brace brackets 210. The brace 212 had a curve or angled section that will allow movement of the tree 204 by the wind without impacting the brace bracket 210 and potentially damaging the tree 204.

Referring specifically to FIG. 15, the bracket 208 has a tubular body 214 that has a central bore 216 that is sized to fit and slide over a stake 202. The body 214 also has a slot member 218 on the exterior of the tubular bracket body 214 that can receive and secure the ends of the corded rubber tree tie 206. The tree tie 206 is wrapped around the trunk of the tree and inserted into the slot of slot member 218 and secured by advancing the bolt 220 through the preferably threaded hole of slot member 218 and engaging the tree tie 206.

In the embodiment shown in FIG. 14, the end of the cross brace 212 is fixed to the stake 202 with a bracket 208 by inserting it into the slot of slot member 218 of the bracket 208 similar to that shown in FIG. 10. Therefore only one type of bracket is necessary to fix both the cross brace 212 and the corded rubber tree ties 206.

The position of the bracket 208 on the stake 202 can be fixed with a transverse bolt or screw 222 that is advanced through the threads of the support 224 and engages the side of the stake 202. The position of the corded rubber tree ties 206 and brackets 208 can also be above or below the position of the cross beam 212 along the length of the stakes 202.

The three stake version of the second alternative embodiment 200 of the invention is generally shown in FIG. 17 with two sets of corded rubber tree ties 206. The cross brace 226 preferably has two legs with an angle of approximately 60 degrees. The legs of the cross brace 226 can have a variety of lengths and represent the distances between the stakes 202. In addition, more than one cross brace 226 can be used and fixed at a position in the middle of or below the tree ties 206.

One leg of cross brace 226 is placed in the slot of bracket 210 that is substantially identical to the bracket 104 shown in FIG. 10 and also bracket 208 illustrated in FIG. 15. One bracket 210 is placed at the apex of the angle of the cross brace 226 and two other brackets 210 are placed at the ends of the two legs of the cross brace 226. The cross brace 226 is secured to the brackets 210 and the stakes 202 by engaging the brace with a screw 128 as seen in FIG. 10.

The four stake version shown in FIG. 18 shows two sets of corded rubber tree ties 206 in a square configuration with a single set of cross braces. The square structure is formed from two cross braces 228, 230 that are angular with an approximately 90 degree central angle with two legs of variable length. The center angle of the cross brace 228 is fixed to a single slot brace bracket 210 that is structurally similar to the bracket 104 shown in FIG. 10. The bracket 210 is preferably placed on the interior of the right angle of the cross brace 228. Brace 230 is similarly secured to a single slot bracket 210. The ends of the legs of each of the braces 228 and 230 are coupled with a double slot brace bracket 232 forming a square with the two cross brace bracket combinations. The double slot brace brackets 232 are substantially similar to the brackets detailed and described in FIG. 16. The legs of the two cross braces 228, 230 are secured to the brackets with screws like 156 and 158 shown in FIG. 16.

In an alternative embodiment, each of the four stakes 202 are joined with four linear cross braces that fit within double slot brackets 232 located on each stake 202. In another embodiment, single bar cross braces joined the stakes together with single slot brackets 210 placed at different elevations and stakes so that each stake is joined to at least one other stake.

The number of spring ties or corded rubber tree ties that are used can also vary although it is preferred that an equal number of ties be used from brackets on each stake to give symmetrical support to the tree.

Finally, it will be seen that the components of the system of the present invention can be assembled as kits in various combinations. For example, spring ties, spring tie brackets, a cross-brace and cross-brace brackets may be packaged or sold together as kits or assemblies for use with two, three or four stakes that are provided by the purchaser. Other kits may include a cross brace, corded rubber tree ties and a single slot bracket that will secure both the cross brace and the tree ties. Still other kits may include three different cross braces and brace brackets or may also include stakes.

From the foregoing it can be seen that the invention can be embodied in various ways, including but not limited to the following:

1. A tree staking apparatus, comprising a tie bracket sleeve with a tubular sleeve portion having interior and exterior surfaces and first and second ends; an aperture extending between the interior and exterior surfaces, and having threads; an elongated locking mechanism having threads that mate with the threads in the aperture, the locking mechanism configured for engaging a tree stake; and a bracket, having a web portion and a pair of legs extending from the web portion at an angle, and the legs having ends that are secured to the exterior surface of the sleeve portion and the bracket is laterally oriented in relation to an axis between the first and second ends of the sleeve portion such that said legs straddle exterior surface of the sleeve portion and the bracket is configured for receiving and holding a tie member.

2. An apparatus according to embodiment 1, further comprising a tie member.

3. An apparatus according to embodiment 1, further comprising first and second cross-brace sleeves that comprise a tubular sleeve portion having interior and exterior surfaces and first and second ends; an aperture extending between the interior and exterior surfaces of the sleeve portion, the aperture having threads; an elongated locking mechanism having threads that mate with the threads in the aperture, the locking mechanism configured for engaging a tree stake; and an adjustable clamp on the exterior surface of the sleeve portion, the clamp having an elongated plate that is longitudinally oriented in relation to an axis between the first and second ends of the sleeve portion, the clamp configured for receiving and holding an end of a cross-brace.

4. An apparatus according to embodiment 3, further comprising a rigid cross-brace.

5. An apparatus according to embodiment 4, wherein the cross-brace comprises a rigid member having a V-shaped central section and co-linear flanges extending from ends of the central section.

6. A tree staking apparatus, comprising: a tie bracket sleeve with a tubular sleeve portion having interior and exterior surfaces and first and second ends; an aperture extending between the interior and exterior surfaces, and having threads; an elongated locking mechanism having threads that mate with the threads in the aperture, the locking mechanism configured for engaging a tree stake; and a bracket, having a web portion and a pair of legs extending from the web portion at an angle, the legs having ends that are secured to the exterior surface of the sleeve portion, and the bracket is laterally oriented in relation to an axis between the first and second ends of the sleeve portion such that said legs straddle the exterior surface of the sleeve portion, and the bracket is configured for receiving and holding a tie member; first and second cross-brace sleeves; and a rigid cross-brace comprising a tubular sleeve portion having interior and exterior surfaces and first and second ends; an aperture extending between the interior and exterior surfaces of the sleeve portion, the aperture having threads; an elongated locking mechanism having threads that mate with the threads in the aperture, with the locking mechanism configured for engaging a tree stake; and an adjustable clamp on the exterior surface of the sleeve portion having an elongated plate that is longitudinally oriented in relation to an axis between the first and second ends of the sleeve portion, and the clamp is configured for receiving and holding an end of the cross-brace.

7. A tree staking apparatus according to embodiment 6, where the cross-brace comprises a rigid member having a V-shaped central section and co-linear flanges extending from ends of the central section.

8. A tree staking apparatus, comprising: first and second tie bracket sleeves having a tubular sleeve portion having interior and exterior surfaces and first and second ends; an aperture extending between the interior and exterior surfaces, and threads; an elongated locking mechanism having threads that mate with the threads in the aperture and configured for engaging a tree stake; and a bracket having a web portion and a pair of legs extending from the web portion at an angle, the legs having ends that are secured to the exterior of the sleeve portion, the bracket being laterally oriented in relation to an axis between the first and second ends of the sleeve portion such that the legs straddle the exterior surface of the sleeve portion, with the bracket configured for receiving and holding a tie member; first and second cross-brace sleeves comprising a tubular sleeve portion having interior and exterior surface and first and second ends; an aperture extending between the interior and exterior surfaces of the sleeve portion and threads; an elongated locking mechanism having threads that mate with the threads in the aperture, the locking mechanism configured for engaging a tree stake; and an adjustable clamp on the exterior surface of the sleeve portion, said clamp having an elongated plate that is longitudinally oriented in relation to an axis between the first and second ends of the sleeve portion, said clamp configured for receiving and holding an end of a cross-brace; a rigid cross-brace; and first and second tie members.

9. A tree staking apparatus according to embodiment 8, wherein the cross-brace comprises a rigid member having a V-shaped central section and co-linear flanges extending from ends of the central section.

10. A tree staking system for tying a tree to more than one stake, comprising a plurality of cross-brace sleeves, each sleeve having a tubular body with interior and exterior surfaces; at least one aperture extending between the interior and exterior surfaces of the sleeve portion, and threads; a locking mechanism having threads that mate with the threads in the aperture, and the locking mechanism is configured for engaging a tree stake disposed in the interior of the tubular body; and a plurality of cross brace retaining members on the exterior surface of the sleeve body, the member having at least one elongated slot with an interior length that is perpendicular to a central axis of said tubular body, and the slot is configured for receiving and holding a section of a cross-brace or a tree tie; a plurality of elongate cross-braces having first and second ends sized for insertion into the slots of the cross brace retaining members; and a plurality of tree ties.

11. A system according to embodiment 10, further comprising a plurality of tie brackets, each tie bracket comprising a tubular sleeve body having interior and exterior surfaces; an aperture extending between the interior and exterior surfaces and threads; an elongated locking mechanism having threads that mate with the threads in the aperture, the locking mechanism configured for engaging a tree stake disposed within the interior of the tubular body; and a tree tie mount secured to the exterior of the tubular sleeve body, the mount having a channel and configured for retaining a tree tie.

12. A system according to embodiment 10, further comprising a plurality of a second cross-brace sleeve, each second sleeve comprising a tubular body having interior and exterior surfaces; an aperture extending between the interior and exterior surfaces of the sleeve portion and threads; a locking mechanism having threads that mate with the threads in the aperture, the locking mechanism configured for engaging a tree stake disposed in the interior of the tubular body; a first cross brace retaining member on the exterior surface of the sleeve body, the member having an elongated slot with an interior length that is perpendicular to a central axis of the tubular body, the slot is configured for receiving and holding a section of a first cross-brace; and a second cross brace retaining member on the exterior surface of the sleeve body, the member having an elongated slot with an interior length that is perpendicular to a central axis of the tubular body and perpendicular to the length of the first slot, the second slot is configured for receiving and holding a section of a second cross-brace.

13. A system according to embodiment 10, wherein the cross-brace comprises a rigid member having a V-shaped central section and co-linear flanges extending from ends of the central section.

14. A system according to embodiment 10, wherein the cross-brace comprises a rigid member having a V-shape.

15. A system according to embodiment 12, wherein the cross-brace comprises a pair of rigid members each having a central right angle, and the pair of members are configured to form a square.

16. A system for tying a tree to more than one stake, comprising: a plurality of tubular cross brace brackets, each bracket with an interior channel adapted to receive a stake within the channel and a locking mechanism configured to engage the stake; at least one cross-brace; means for reversibly coupling a section of a cross brace with a cross brace bracket; and means for reversibly coupling a tree tie with a cross brace bracket, wherein the cross brace is coupled to at least two cross brace brackets.

17. A system according to embodiment 16, wherein the means for reversibly coupling a tree tie and the means for coupling a cross-brace to a cross brace bracket are the same.

18. A system according to embodiment 16, wherein the means for reversibly coupling a cross-brace to a cross brace bracket comprises at least one cross brace retaining member on an exterior surface of a bracket body, the member having an elongated slot with an interior length that is perpendicular to a central axis of the tubular body, the slot configured for receiving and holding a section of a cross-brace; and means for retaining said cross-brace within the slot.

19. A system according to embodiment 18, wherein the means for reversibly coupling a tree tie with a cross brace bracket comprises: transverse screw disposed within a threaded aperture within the cross-brace retaining member.

20. A system for tying a tree to four stakes, comprising: a pair of first cross-brace sleeves, each first sleeve comprising a tubular body having interior and exterior surfaces; an aperture extending between the interior and exterior surfaces of the sleeve portion, said aperture having threads; a locking mechanism having threads that mate with the threads in the aperture, the locking mechanism configured for engaging a tree stake disposed in the interior of said body; and a cross brace retaining member on the exterior surface of the sleeve body, the member having an elongated slot with an interior length that is perpendicular to a central axis of the tubular body, and the slot is configured for receiving and holding a section of a cross-brace; a pair of second cross-brace sleeves, each second sleeve comprising: a tubular body having interior and exterior surfaces; an aperture extending between the interior and exterior surfaces of the sleeve portion, with threads; a locking mechanism having threads that mate with the threads in the aperture, and the locking mechanism is configured for engaging a tree stake disposed in the interior of the tubular body; a first cross brace retaining member on the exterior surface of the sleeve body, the member having an elongated slot with an interior length that is perpendicular to a central axis of the tubular body, and the slot is configured for receiving and holding a section of a first cross-brace; and a second cross brace retaining member on the exterior surface of the sleeve body, the member having an elongated slot with an interior length that is perpendicular to a central axis of the tubular body and perpendicular to the length of the first slot, the second slot configured for receiving and holding a section of a second cross-brace; a plurality of elongate cross-braces having first and second ends sized for insertion into the slots of the first and second cross brace retaining members; a plurality of tree ties; and a plurality of tie brackets, each tie bracket comprising: a tubular sleeve body having interior and exterior surfaces; an aperture extending between the interior and exterior surfaces, and threads; an elongated locking mechanism having threads that mate with the threads in the aperture, the locking mechanism configured for engaging a tree stake disposed within the interior of the tubular body; and a tree tie mount secured to the exterior of the tubular sleeve body, the mount having a channel, the tie mount configured for receiving and holding a tie member.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for tying a tree to more than one stake, comprising:
   (a) a plurality of cross-brace sleeves, each sleeve comprising:
      (i) a tubular body having interior and exterior surfaces;
      (ii) at least one aperture extending between the interior and exterior surfaces of the tubular body, said aperture having threads;
      (iii) a locking mechanism having threads that mate with the threads in the aperture of the tubular body, said locking mechanism configured for engaging a tree stake disposed in the interior of said tubular body; and
      (iv) a plurality of cross brace retaining members on the exterior surface of the tubular body, each member having at least one elongated slot with an interior length that is perpendicular to a central axis of said tubular body, each slot configured for receiving and holding a section of a cross-brace or a tree tie;
   (b) a plurality of elongate cross-braces having first and second ends sized for insertion into the slots of said cross brace retaining members; and
   (c) a plurality of tree ties.

2. A system as recited in claim 1, further comprising a plurality of tie brackets, each tie bracket comprising:
   (i) a tubular sleeve body having interior and exterior surfaces;
   (ii) an aperture extending between the interior and exterior surfaces, said aperture having threads;
   (iii) an elongated locking mechanism having threads that mate with the threads in the aperture, said locking mechanism configured for engaging a tree stake disposed within the interior of said tubular body; and
   (iv) a tree tie mount secured to the exterior of the tubular sleeve body, said mount having a channel, said tie mount configured for retaining a tree tie.

3. A system as recited in claim 1, further comprising a plurality of second cross-brace sleeves, each second sleeve comprising:
   (i) a tubular body having interior and exterior surfaces;
   (ii) an aperture extending between the interior and exterior surfaces of the tubular body, said aperture having threads;
   (iii) a locking mechanism having threads that mate with the threads in the aperture, said locking mechanism configured for engaging a tree stake disposed in the interior of said tubular body;
   (iv) a first cross brace retaining member on the exterior surface of the tubular body, said member having an elongated slot with an interior length that is perpendicular to a central axis of said tubular body, said slot configured for receiving and holding a section of a first cross-brace; and
   (iv) a second cross brace retaining member on the exterior surface of the tubular body, said member having an elongated slot with an interior length that is perpendicular to a central axis of said tubular body and perpendicular to the length of said first slot, said second slot configured for receiving and holding a section of a second cross-brace.

4. A system as recited in claim 3, wherein said cross-brace comprises a pair of rigid members each having a central right angle, said pair of members configured to form a square.

5. A system as recited in claim 1, wherein said cross-brace comprises a rigid member having a V-shaped central section and co-linear flanges extending from ends of the central section.

6. A system as recited in claim 1, wherein said cross-brace comprises a rigid member having a V-shape.

7. A system for tying a tree to more than one stake, comprising:
   a plurality of tubular cross-brace brackets, each bracket with an interior channel adapted to receive a stake within said channel and a locking mechanism configured to engage the stake;
   at least one cross-brace;
   at least one cross-brace retaining member on an exterior surface of a bracket body, each member having an elongated slot with an interior length that is perpendicular to a central axis of said tubular bracket, each slot configured for receiving and holding a section of a cross-brace; and means for retaining said cross-brace within said slot; and
   means for reversibly coupling a tree tie with a cross-brace bracket;
   wherein said cross-brace is coupled to at least two cross-brace brackets.

8. A system as recited in claim 7, wherein said means for reversibly coupling a tree tie and said means for coupling a cross-brace to a cross brace bracket are the same.

9. A system as recited in claim 7, wherein said means for retaining said reversibly coupling a tree tie with a cross brace bracket comprises:
   a transverse screw disposed within a threaded aperture within said cross-brace retaining member.

10. A system for tying a tree to four stakes, comprising:
    (a) a pair of first cross-brace sleeves, each first sleeve comprising:
       (i) a tubular body having interior and exterior surfaces;

(ii) an aperture extending between the interior and exterior surfaces of the tubular body, said aperture having threads;
(iii) a locking mechanism having threads that mate with the threads in the aperture, said locking mechanism configured for engaging a tree stake disposed in the interior of said body; and
(iv) a cross brace retaining member on the exterior surface of the tubular body, said member having an elongated slot with an interior length that is perpendicular to a central axis of said tubular body, said slot configured for receiving and holding a section of a cross-brace;

(b) a pair of second cross-brace sleeves, each second sleeve comprising:
  (i) a tubular body having interior and exterior surfaces;
  (ii) an aperture extending between the interior and exterior surfaces of the tubular body, said aperture having threads;
  (iii) a locking mechanism having threads that mate with the threads in the aperture, said locking mechanism configured for engaging a tree stake disposed in the interior of said tubular body;
  (iv) a first cross-brace retaining member on the exterior surface of the tubular body, said member having an elongated slot with an interior length that is perpendicular to a central axis of said tubular body, said slot configured for receiving and holding a section of a first cross-brace; and
  (iv) a second cross-brace retaining member on the exterior surface of the tubular body, said member having an elongated slot with an interior length that is perpendicular to a central axis of said tubular body and perpendicular to the length of said first slot, said second slot configured for receiving and holding a section of a second cross-brace;

(c) a pair of elongate cross-braces having a first leg at a right angle to a second leg with first and second ends sized for insertion into the slots of said first and second cross-brace retaining members;
(d) a plurality of tree ties; and
(e) a plurality of tie brackets, each tie bracket comprising:
  (i) a tubular sleeve body having interior and exterior surfaces;
  (ii) an aperture extending between the interior and exterior surfaces, said aperture having threads;
  (iii) an elongated locking mechanism having threads that mate with the threads in the aperture, said locking mechanism configured for engaging a tree stake disposed within the interior of said tubular body; and
  (iv) a tree tie mount secured to the exterior of the tubular sleeve body, said mount having a channel, said tie mount configured for receiving and holding a tie member;

wherein one leg of a first cross-brace of said pair of cross-braces is coupled to a first cross-brace sleeve of said first pair of cross-brace sleeves;
wherein one leg of a second cross-brace of said pair of cross-braces is coupled to a second cross-brace sleeve of said first pair of cross-brace sleeves;
wherein the first end of the first cross-brace is coupled to one second cross-brace sleeve of said pair of second cross-brace sleeves and the second end of the first cross-brace is coupled to the other second cross-brace sleeve; and
wherein the first end of the second cross-brace is coupled to one second cross-brace sleeve of said pair of second cross-brace sleeves and the second end of the second cross-brace is coupled to the other second cross-brace sleeve.

* * * * *